United States Patent [19]

Nejatbina

[11] Patent Number: 5,782,416

[45] Date of Patent: Jul. 21, 1998

[54] APPARATUS FOR BREAKING UP FOOD WITHIN A FOOD PROCESSOR

[76] Inventor: Iradj Nejatbina, 320 N. Lapeer Dr. #201, Beverly Hills, Calif. 90211

[21] Appl. No.: 736,776

[22] Filed: Oct. 25, 1996

[51] Int. Cl.⁶ .................................................. B02C 18/18
[52] U.S. Cl. ........................................ 241/194; 291/282.1
[58] Field of Search ........................... 366/314; 241/191, 241/282.1, 282.2, 194

[56] References Cited

U.S. PATENT DOCUMENTS 3,156,278  11/1964  Otto ....................................... 241/282.2

FOREIGN PATENT DOCUMENTS

| 2418672 | 11/1979 | France | 241/282.1 |
| 937072 | 12/1955 | Germany | 241/194 |
| 1130972 | 6/1962 | Germany | 241/282.1 |
| 1025432 | 2/1986 | Japan | 241/282.1 |

Primary Examiner—Mark Rosenbaum

[57] ABSTRACT

An apparatus for breaking up food within a food processor including a rotating cutting mechanism situated therein. Further provided is at least one rod-like particle remover mechanism including a rod pivotally coupled above the cutting mechanism. As such, upon rotation of the cutting mechanism, the particle remover mechanism is adapted to rotate coincidentally thereby breaking up particles for further processing.

1 Claim, 2 Drawing Sheets

APPARATUS FOR BREAKING UP FOOD WITHIN A FOOD PROCESSOR

BACKGROUND OF THE INVENTION

1. Field of the Invention

The present invention relates to an apparatus for breaking up food within a food processor and more particularly pertains to dispersing particles so as to allow said particles to be deposited adjacent a cutting mechanism of the food processor for further processing.

2. Description of the Prior Art

The use of food processors is known in the prior art. More specifically, food processors heretofore devised and utilized for the purpose of grinding, mixing, and cutting food are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 5,383,613 to Sundquist and assigned to AB Hallde Maskiner; U.S. Pat. No. 5,104,050 to Herbert and assigned to HR&D, Inc.; U.S. Pat. No. 4,746,072 to Bricker and assigned to Bricker Products, Inc.; U.S. Pat. No. 4,752,041 to Franke et al. and assigned to Braun Aktiengesellschaft; and U.S. Pat. No. 4,856,718 to Gaber et al. and assigned to Better Mousetraps, Inc.

In this respect, the apparatus for breaking up food within a food processor according to the present invention substantially departs from the conventional concepts and designs of the prior art, and in so doing provides an apparatus primarily developed for the purpose of dispersing particles so as to allow said particles to be deposited adjacent a cutting mechanism of the food processor for further processing.

Therefore, it can be appreciated that there exists a continuing need for a new and improved apparatus for breaking up food within a food processor which can be used for dispersing particles so as to allow said particles to be deposited adjacent a cutting mechanism of the food processor for further processing. In this regard, the present invention substantially fulfills this need.

SUMMARY OF THE INVENTION

In view of the foregoing disadvantages inherent in the known types of food processors now present in the prior art, the present invention provides an improved apparatus for breaking up food within a food processor. As such, the general purpose of the present invention, which will be described subsequently in greater detail, is to provide a new and improved apparatus for breaking up food within a food processor which has all the advantages of the prior art and none of the disadvantages.

To attain this, the present invention essentially comprises a food processor housing with a transparent container having a circular base, a cylindrical periphery integrally formed with the base, and a circular cover. For allowing removable coupling of the cover with the periphery, a lip depends from the cover, thereby affording selective access within the container. As shown in FIG. 1, the cover further includes a tube situated eccentrically thereon and extending upwardly therefrom. By including the tube, food may be forced therethrough to be ultimately deposited within the container for processing. As best shown in FIGS. 2-4, a cutting mechanism with a central cylindrical plastic post is included. Such post is corrugated for convenient gripping. Associated therewith is a plastic disk concentrically formed integrally on a bottom end of the post. Ideally, the disk has a diameter greater than that of the post. Further provided is a pair of metal blade units each having a planar annular ring with a diameter equal to that of the disk. Each ring has a blade protruding therefrom with a generally triangular configuration. The blades include a first convex cutting edge having a first arc length and another concave edge having a second arc length approximately half the first arc length. In the preferred embodiment, the blade units include a first blade unit horizontally oriented with the ring thereof disposed about the post and further coupled to a top face of the disk. A second blade unit is horizontally oriented with the ring thereof concentrically coupled to a bottom face of the disk with the blade thereof situated opposite the blade of the first blade unit. As seen in FIG. 4, a bore is formed in the post and disk with a rod concentrically coupled at a top end thereof within the bore. By this structure, the cutting mechanism is attached to the food processor housing thus effecting rotation thereof. Finally, a pair of particle remover mechanisms each include a metal eyelet with a post integrally formed therewith and extending therefrom. Such post is included for coupling with the post of the cutting mechanism. The particle remover mechanisms each also include an elongated metal rod with a length slightly less than the blades of the blade units. Formed on a first end of the rod is a loop for permanently coupling with the eyelet. The particle remover mechanisms include a first particle remover mechanism with the post of the eyelet thereof coupled to the post of the cutting mechanism adjacent to the top end thereof. A second particle remover mechanism is also included with the post of the eyelet thereof coupled to the post of the cutting mechanism opposite the first particle remover mechanism and further spaced therebeneath.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved apparatus for breaking up food within a food processor which has all the advantages of the prior art food processors and none of the disadvantages.

It is another object of the present invention to provide a new and improved apparatus for breaking up food within a food processor which may be easily and efficiently manufactured and marketed.

It is a further object of the present invention to provide a new and improved apparatus for breaking up food within a food processor which is of a durable and reliable construction.

An even further object of the present invention is to provide a new and improved apparatus for breaking up food within a food processor which is susceptible of a low cost of manufacture with regard to both materials and labor, and which accordingly is then susceptible of low prices of sale to the consuming public, thereby making such apparatus for breaking up food within a food processor economically available to the buying public.

Still yet another object of the present invention is to provide a new and improved apparatus for breaking up food within a food processor which provides in the apparatuses and methods of the prior art some of the advantages thereof, while simultaneously overcoming some of the disadvantages normally associated therewith.

Still another object of the present invention is to disperse particles so as to allow said particles to be deposited adjacent a cutting mechanism of the food processor for further processing.

Lastly, it is an object of the present invention to provide a new and improved apparatus for breaking up food within a food processor including a rotating cutting mechanism situated therein. Further provided is at least one rod-like particle remover mechanism including a rod pivotally coupled above the cutting mechanism. As such, upon rotation of the cutting mechanism, the particle remover mechanism is adapted to rotate coincidentally thereby breaking up particles for further processing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
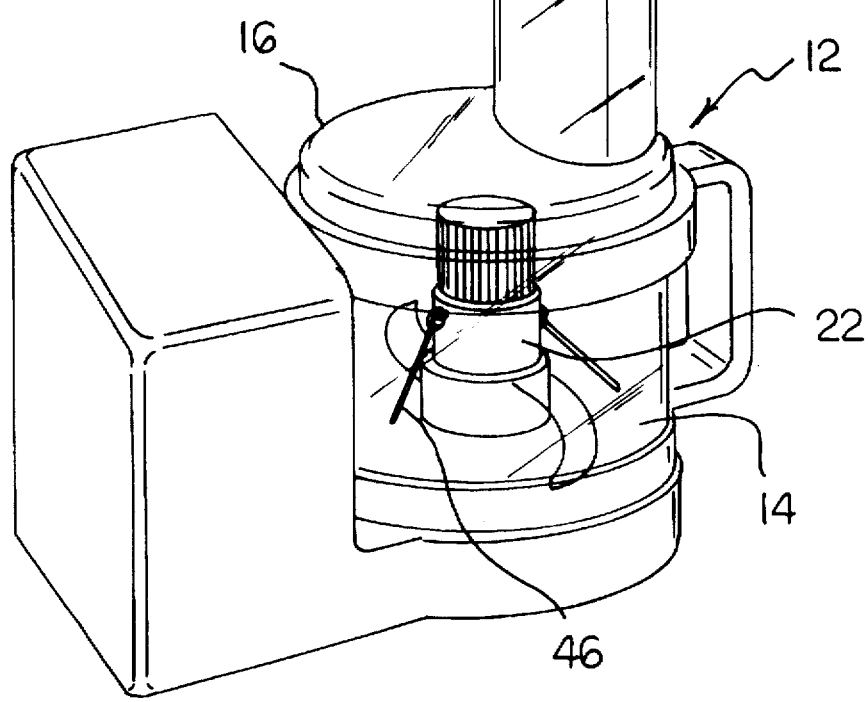
FIG. 1 is a perspective illustration of the preferred embodiment of the apparatus for breaking up food within a food processor constructed in accordance with the principles of the present invention.

With reference now to the drawings, and in particular to FIG. 1 thereof, a new and improved apparatus for breaking up food within a food processor embodying the principles and concepts of the present invention and generally designated by the reference numeral 10 will be described.

The present invention, the new and improved apparatus for breaking up food within a food processor, is comprised of a plurality of components. Such components in their broadest context include a cutting mechanism and a particle remover mechanism. Such components are individually configured and correlated with respect to each other so as to attain the desired objective.

More specifically, it will be noted that the system 10 of the present invention includes a food processor housing 12 with a transparent container 14 having a circular base, a cylindrical periphery integrally formed with the base, and a circular cover 16. For allowing removable coupling of the cover with the periphery, a lip depends therefrom, thereby affording selective access within the container. As shown in FIG. 1, the cover further includes a tube 18 situated eccentrically thereon and extending upwardly therefrom. By including the tube, food may be forced therethrough to be ultimately deposited within the container for processing. As an option, a handle may be formed thereon for conveniently transporting the present invention.

Figure 2:
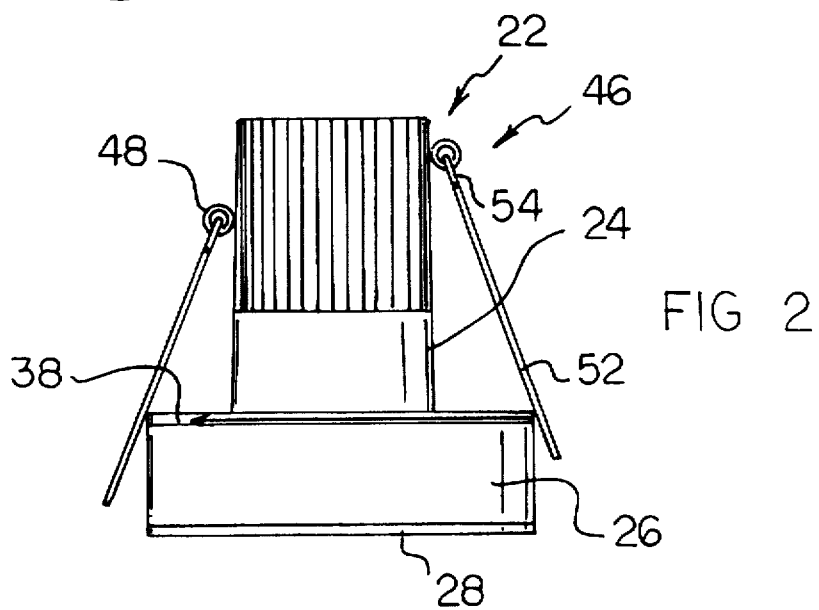
FIG. 2 is a side elevational view of the present invention depicting the cutting mechanism.
Figure 3:
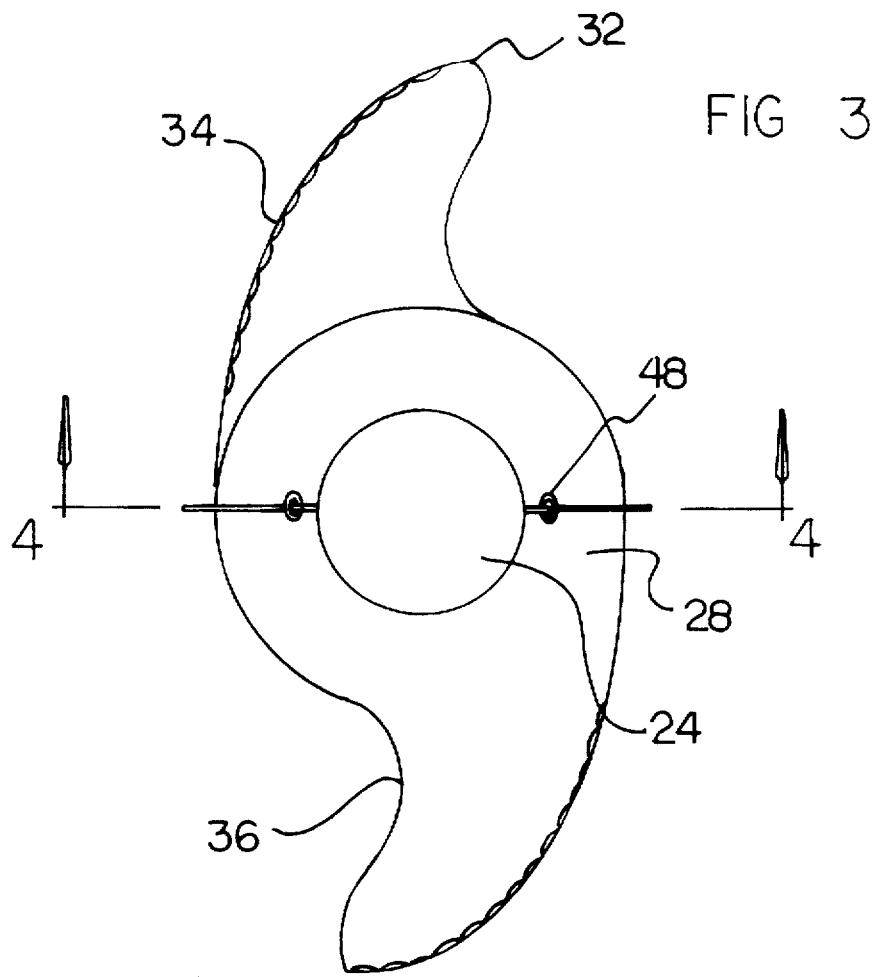
FIG. 3 is a top plan view of the present invention.
Figure 4:
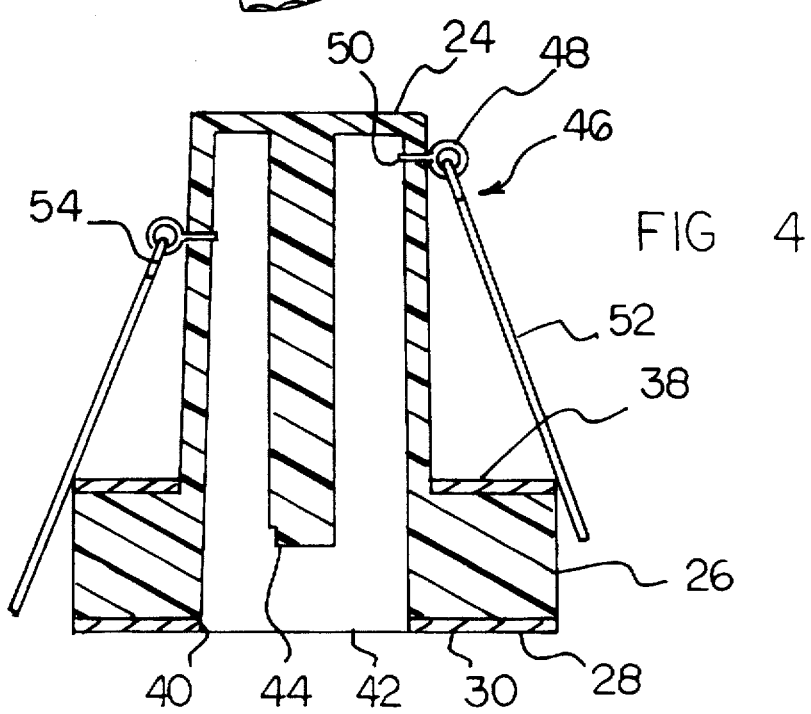
FIG. 4 is a cross-sectional view of the present invention taken along lines 4—4 shown in FIG. 3.

As best shown in FIGS. 2-4, a cutting mechanism 22 with a central cylindrical plastic post 24 is included. Such post is corrugated for convenient gripping and further has a length of approximately 5 cm. Associated therewith is a plastic disk 26 concentrically formed integrally on a bottom end of the post. Ideally, the disk has a diameter greater than that of the post. Further provided is a pair of metal blade units 28 each having a planar annular ring 30 with a diameter equal to that of the disk. Each ring has a blade 32 protruding therefrom with a generally triangular configuration. The blades include a first convex cutting edge 34 having a first arc length and another concave edge 36 having a second arc length approximately half the first arc length. In the preferred embodiment, the blade units include a first blade unit 38 horizontally oriented with the ring thereof disposed about the post and further coupled to a top face of the disk. A second blade unit 40 is horizontally oriented with the ring thereof concentrically coupled to a bottom face of the disk with the blade thereof situated opposite the blade of the first blade unit and further spaced therebeneath. As seen in FIG. 4, a bore 42 is formed in the post and disk with a rod 44 concentrically coupled at a top end thereof within the bore. By this structure, the cutting mechanism is attached to the food processor housing thus effecting rotation thereof.

Finally, a pair of particle remover mechanisms 46 each include a metal eyelet 48 with a post 50 integrally formed therewith and extending therefrom. Preferably, a plane in which the post resides is coextensive with a plane in which the eyelet resides. Such post is included for coupling with the post of the cutting mechanism. Ideally, the eyelet and post have a circular cross-section with a diameter of approximately 0.1 cm.

The particle remover mechanisms each also include an elongated metal rod 52 with a length slightly less than the blades of the blade units. Formed on a first end of the rod is a loop 54 for permanently coupling with the eyelet. It should be noted that the pivotal coupling of the rod is effected adjacent to the post. Ideally, the rod and loop have a circular cross-section with a diameter of approximately 0.1 cm. The particle remover mechanisms include a first particle remover mechanism with the post of the eyelet thereof coupled to the post of the cutting mechanism adjacent to the top end thereof. A second particle remover mechanism is also included with the post of the eyelet thereof coupled to the post of the cutting mechanism opposite the first particle remover mechanism and further spaced therebeneath. Such spacing is approximately 2 cm or 40% the length of the post. In addition, it should be noted that the second particle remover is situated a distance above the first blade equivalent to 60% the total height of the post.

In use, upon rotation of the cutting mechanism, the particle remover mechanisms are adapted rise from a normally relaxed generally vertical orientation to rotate within a horizontal plane. As such, they are adapted to break up particles allowing said particles to be deposited adjacent the blade units for further processing.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved apparatus for breaking up food within a food processor comprising, in combination:

a food processor housing with a transparent container having a circular base, a cylindrical periphery integrally formed with the base, and a circular cover with a lip depending therefrom for allowing removable coupling with the periphery, thereby affording selective access within the container, the cover further including a tube situated eccentrically thereon and extending upwardly therefrom for allowing the insertion of food therethrough to be ultimately deposited within the container for processing, the housing having a handle formed thereon for conveniently transporting the processor;

a cutting mechanism with a central cylindrical plastic post corrugated for convenient gripping, a plastic disk concentrically formed integrally on a bottom end of the post with a diameter greater than that of the post, and a pair of metal blade units each having a planar annular ring with a diameter equal to that of the disk, the ring having a blade protruding therefrom with a generally triangular configuration, the blade including a first convex cutting edge having a first arc length and another concave edge having a second arc length approximately half the first arc length, the blade units including a first blade unit horizontally oriented with the ring thereof disposed about the post and further coupled to a top face of the disk and a second blade unit horizontally oriented with the ring thereof concentrically coupled to a bottom face of the disk with the blade thereof situated opposite the blade of the first blade unit and further spaced therebeneath, wherein a bore is formed in the post and disk with a rod concentrically coupled at a top end thereof within the bore for coupling with the food processor housing and further allowing the rotation thereof; and a pair of particle remover mechanisms each including a metal eyelet with a post integrally formed therewith and extending therefrom for coupling with the post of the cutting mechanism, wherein a plane in which the post resides is coextensive with a plane in which the eyelet resides, wherein the eyelet and post have a circular cross-section with a diameter of approximately 0.1 cm, the particle remover mechanisms also including an elongated metal rod with a length slightly less than the blades of the blade units, the elongated rod having a loop formed on a first end thereof for permanently coupling with the eyelet, wherein the rod and loop have a circular cross-section with a diameter of approximately 0.1 cm, the particle remover mechanisms including a first particle remover mechanism with the post of the eyelet thereof coupled to the post of the cutting mechanism adjacent to the top end thereof and a second particle remover mechanism with the post of the eyelet thereof coupled to the post of the cutting mechanism opposite the first particle remover mechanism and further spaced therebeneath, wherein the second particle remover mechanism is spaced below the first particle remover mechanism 40% a height of the post and the second particle remover is situated a distance above the first blade unit equivalent to 60% the height of the post of the cutting mechanism;

whereby upon rotation of the cutting mechanism, the particle remover mechanisms are adapted to rotate within a horizontal plane thereby breaking up particles allowing said particles to be deposited adjacent the blade units for further processing.

* * * * *